(12) United States Patent
Blandy et al.

(10) Patent No.: US 6,385,764 B1
(45) Date of Patent: May 7, 2002

(54) METHOD AND APPARATUS FOR IMPROVING INVOCATION SPEED OF JAVA METHODS

(75) Inventors: Geoffrey Owen Blandy; Bentley John Hargrave, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,013

(22) Filed: Jan. 29, 1999

(51) Int. Cl.[7] ............................................... G06F 9/45
(52) U.S. Cl. ...................... 717/4; 717/5; 717/9; 709/1; 709/315
(58) Field of Search ................ 717/4, 8, 9, 5; 709/1, 108, 107, 315

(56) References Cited

U.S. PATENT DOCUMENTS

| | | | | |
|---|---|---|---|---|
| 5,421,012 A | * | 5/1995 | Khoyi et al. ................ 709/107 |
| 5,555,411 A | * | 9/1996 | England et al. ................ 717/5 |
| 5,715,463 A | * | 2/1998 | Merkin .......................... 717/11 |
| 5,970,252 A | * | 10/1999 | Buxton et al. ................. 717/11 |
| 6,295,643 B1 | * | 9/2001 | Brown et al. ................... 717/9 |

* cited by examiner

Primary Examiner—Tuan Q. Dam
Assistant Examiner—John Q. Chavis
(74) Attorney, Agent, or Firm—Duke W. Yee; Jeffrey S. LaBaw; Michael R. Nichols (57) ABSTRACT

A method and apparatus for executing a method. A bytecode invoking a method is detected. A method block is located associated with the method, wherein the method block includes an identification of an invoker. The invoker is called, wherein the invoker performs setup for execution of the method. The setup performed by the invoker is tailored specifically to the method. A completion of the method is detected and returns control to the invoker, wherein the invoker completes processing of the method.

25 Claims, 8 Drawing Sheets

METHOD AND APPARATUS FOR IMPROVING INVOCATION SPEED OF JAVA METHODS

BACKGROUND OF THE INVENTION

1. Technical Field

The present invention relates generally to an improved data processing system and in particular to an improved method and apparatus for executing instructions in a data processing system. Still more particularly, the present invention relates to a method and apparatus for improving invocation speed of Java methods in a data processing system.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK), available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

When extra speed in executing a Java program is needed, a Just In Time (JIT) compiler may be used to translate bytecodes for a method or class into native machine instructions before executing them. Typically, this compilation only occurs once per method. Some JIT compilers may compile entire classes, rather than one method at a time.

When a JVM interpreter encounters an invoke bytecode, the JVM interpreter locates the appropriate method to be called and then calls the method. This calling of the method may be performed by locating a method block and branching to the invoker for the method. The method block identifies the invoker and is a per method data structure. The invoker performs the function activation and creates a stack frame for the target method. This process performed by the invoker involves ensuring that parameters are passed appropriately to the target method. A monitor, also referred to as a lock, is obtained by the invoker if the method is synchronized. Other housekeeping chores may be involved based on the particular target method.

When the JVM interpreter encounters a return bytecode, signaling method completion, a complimentary set of housekeeping chores must be performed to deactivate the function, release the stack frame, release the monitor if acquired, and properly return the result to the caller. The standard JVM implementation from Sun Microsystems, Inc. provides invokers for synchronized and non-synchronized methods. However, the return bytecodes, which return to the calling method directly, have no such specialization and must check the characteristics of the calling methods to properly complete the return. Furthermore, the invokers may be required to set flags that are subsequently examined by the return bytecodes in presently available JVM implementations.

The current implementation of JVM's only employs invokers, which have limited specialization and generalized return bytecodes, which must perform runtime checks to determine which tasks must be performed during function activation/deactivation. Function activation is all the steps necessary to properly call a method. It includes passing the parameters on the stack, setting up the stack frame with any values required by the method (e.g. a pointer to the method block for the called method), storing the return address to which control should be transferred when the method competes and acquiring the object monitor if the method is synchronized. This data structure on the stack is referred to as the function activation record. Function deactivation is all the steps necessary to terminate a method call. It includes releasing the stack frame for the method call, releasing the object monitor if the method is synchronized, removing the passed parameters from the stack and placing the called methods return value, if any, on the calling method's stack. When function deactivation is complete, the function activation record for the called method has been removed from the stack. Such a procedure has a negative performance impact.

Therefore, it would be advantageous to have a method and apparatus for invoking methods in a fashion that eliminates the need for runtime decisions based on method characteristics.

SUMMARY OF THE INVENTION

The present invention provides a method and apparatus for executing a method. A bytecode invoking a method is detected. A method block is located associated with the method, wherein the method block includes an identification of an invoker. The invoker is called, wherein the invoker performs setup for execution of the method. The setup performed by the invoker is tailored specifically to the method. A completion of the method is detected and returns control to the invoker, wherein the invoker completes processing of the method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
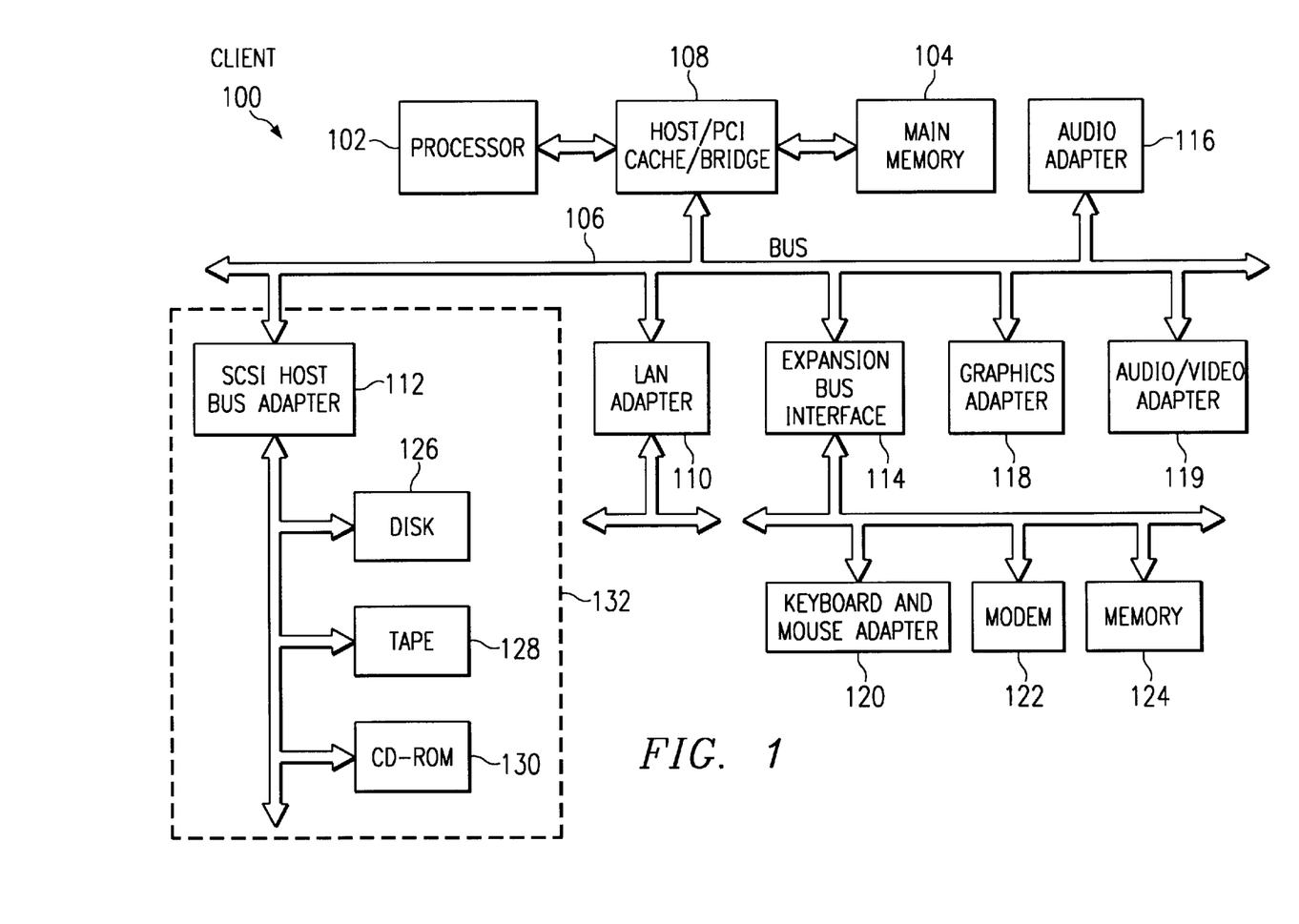
FIG. 1 is a block diagram illustrating a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 132 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/ or user-generated data.

The depicted example in FIG. 1 and above-described examples are not meant to imply architectural limitations with respect to the present invention.

The present invention provides a method, apparatus, and instructions used to provide a performance boost to a JVM interpreter with only the addition of minimal code to the JVM. The present invention is particularly applicable to small computing devices in which the overhead of a just in time compiler to increase performance is too large. The present invention employs a number of different invokers, which are specialized for the particular needs of a method. In addition, the present invention employs return bytecodes that return control to an invoker instead of the caller. The appropriate invoker is selected at class load time based on the characteristics of the method. This invoker performs the necessary steps or functions. The tailoring of the invoker to the method type eliminates the need for runtime decisions based on method characteristics.

Figure 2:
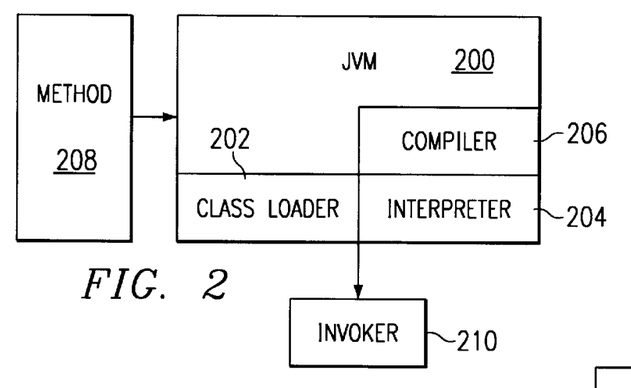
FIG. 2 is a block diagram of components used to process methods in accordance with a preferred embodiment of the present invention.

With reference now to FIG. 2, a block diagram of components used to process methods is depicted in accordance with a preferred embodiment of the present invention. In the depicted example, JVM 200 includes a class loader 202, an interpreter 204, and a compiler 206. JVM 200 will start execution by invoking a method of a specified class. In the depicted example, the method may be for example, main. The method may be passed as a single argument in the form of an array of strings. This causes the specified class to be loaded, linked to other types that it uses, and initialized. The loading of a class involves the finding of the binary form of a class or interface type of the particular name.

In the depicted example, the loading process is implemented by class loader 202. Class loader 202 in this example includes a ClassLoader class, which includes methods for loading new classes into the Java runtime environment. The class loader is an object responsible for loading classes. Given the name of a class, the class loader will attempt to locate or generate data that constitutes a definition for the class. Typically, a class loader will transform the name of a class into a file name and then read a "class file" of that name from a file system. Interpreter 204 is a program that uses a bytecode to identify a sequence of native instructions in the interpreter which performs the function of the bytecode and then executes the sequence of native instructions thus performing the function of the bytecode. In this case, interpreter 204 contains the processes and data structures used to interpret bytecodes within method 208 for execution within the data processing system. The interpreter is directed by the bytecode to execute native code to perform the function indicated by the bytecode.

Compiler 206 incorporates a compiler class, which includes methods for compiling methods to native instructions prior to execution. Compiler 206 is optional within JVM 200. In many cases where JVM 200 is implemented in a small computing device, the overhead of a just in time compiler is too large and JVM 200 will not include compiler 206. The processes in the present invention are applicable whether or not compiler 206 is present.

When interpreter 204 encounters an invoke bytecode, interpreter 204 will locate an appropriate method, such as method 208. Additionally, when the native instructions generated by compiler 206 intend to call a method, these native instructions will also locate an appropriate method, such as method 208. Thereafter, the process will branch to invoker 210, which will perform the necessary setup for execution of method 208. Invoker 210 is the routine that performs the actual setup prior to passing control to the method 208.

Figures 3, 4:
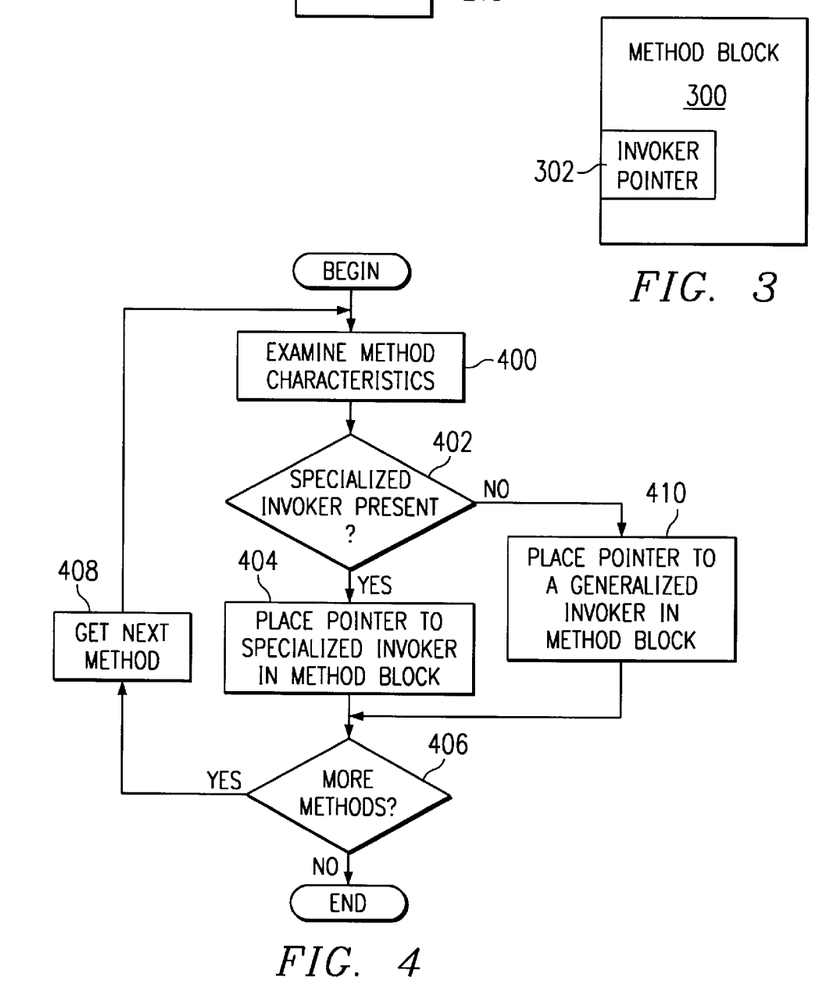
FIG. 3 is an illustration of a method block in accordance with a preferred embodiment of the present invention.
FIG. 4 is a high level flowchart of a process for selecting specialized invokers in accordance with a preferred embodiment of the present invention.
Figure 5A:
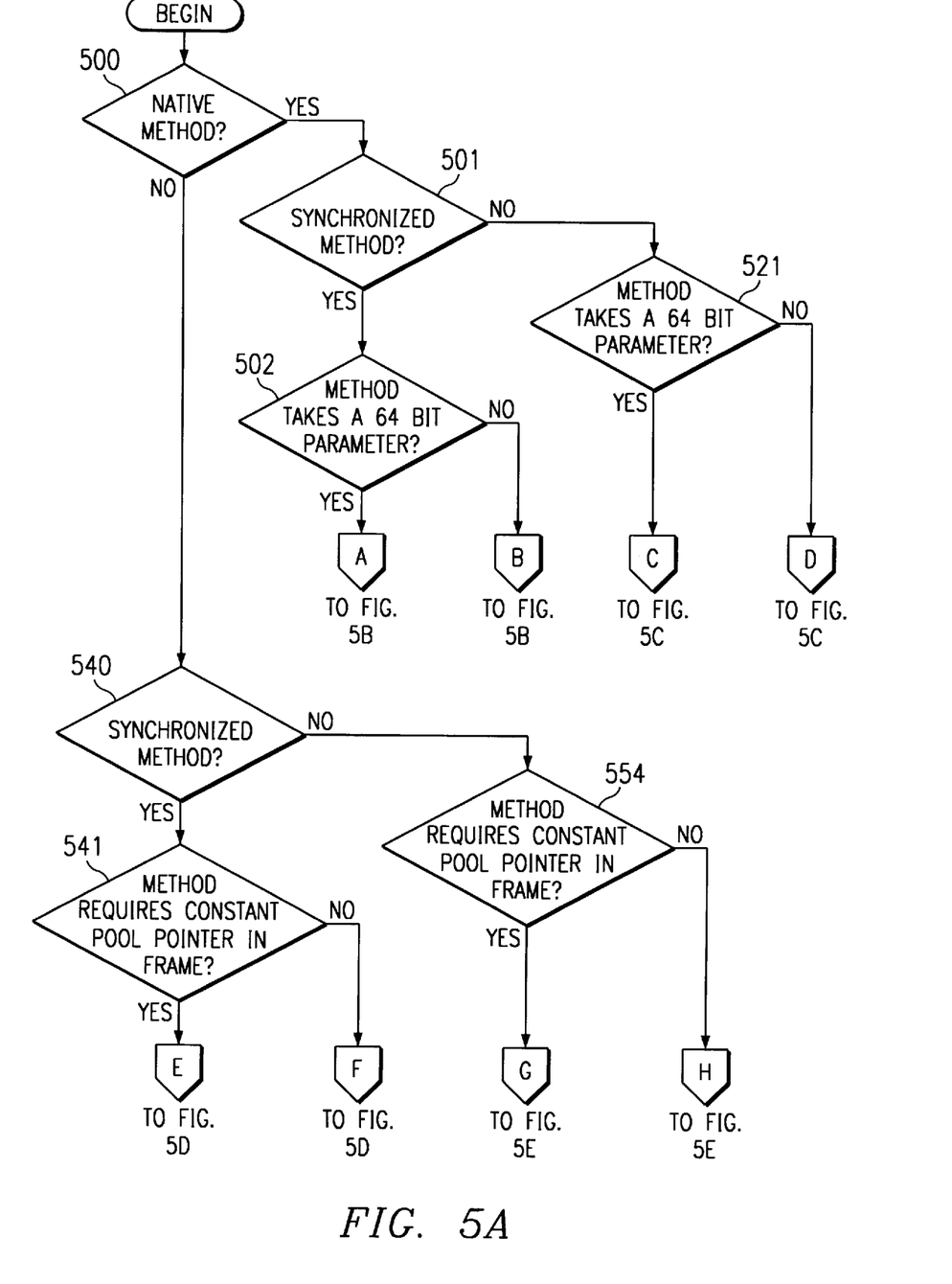
FIGS. 5A–5E are flowcharts of a process for selecting a specialized invoker in accordance with a preferred embodiment of the present invention.
Figure 5B:
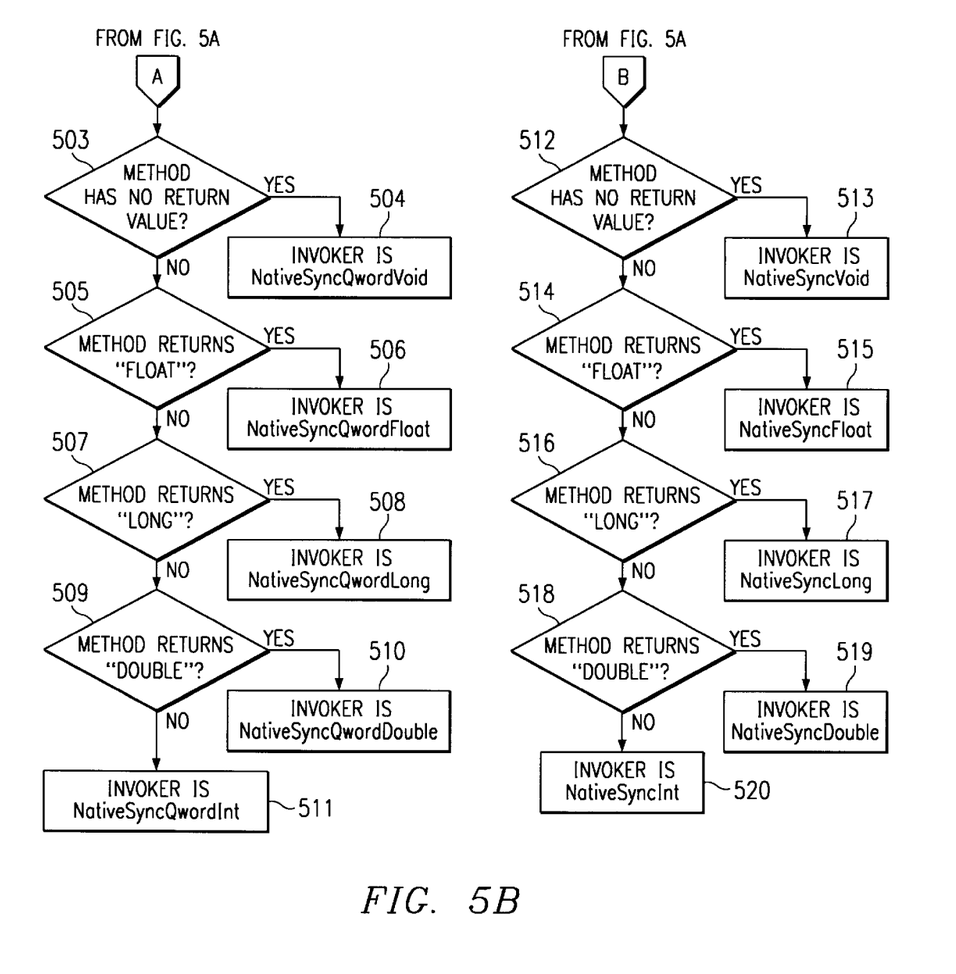
Figure 5C:
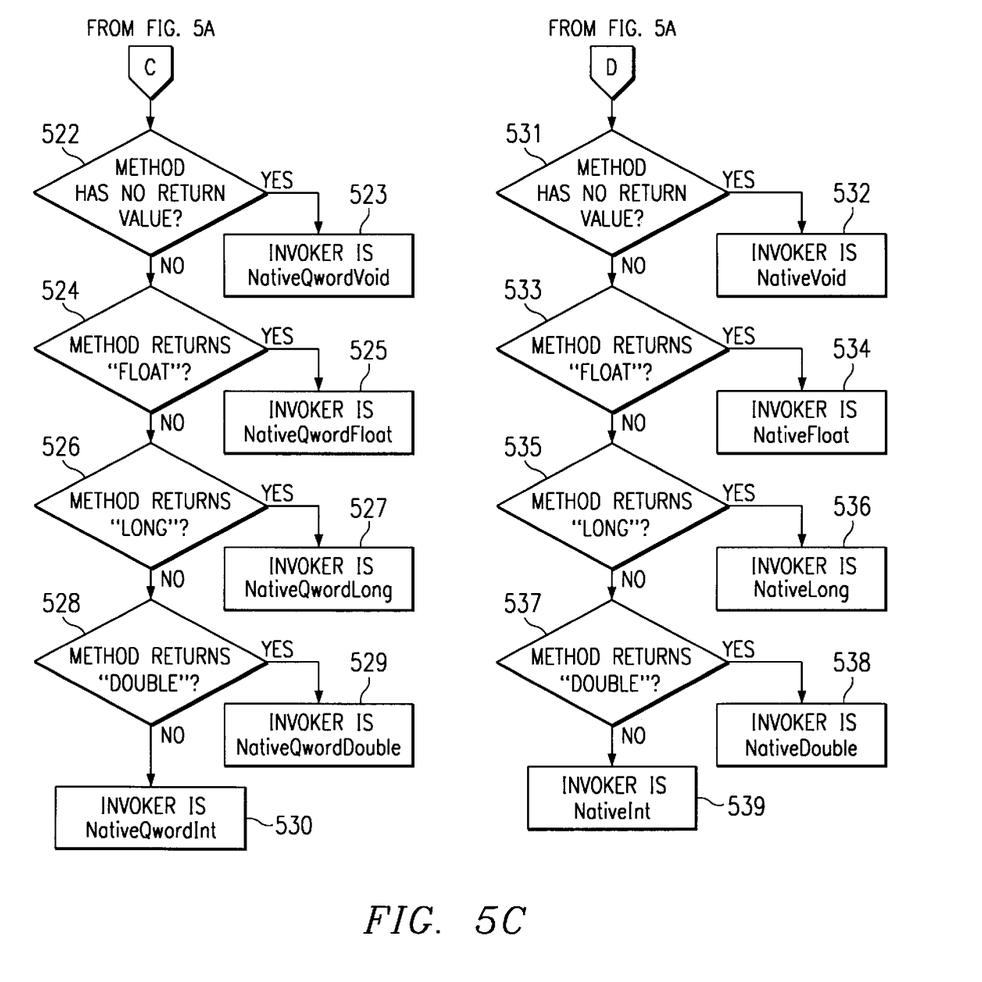
Figure 5D:
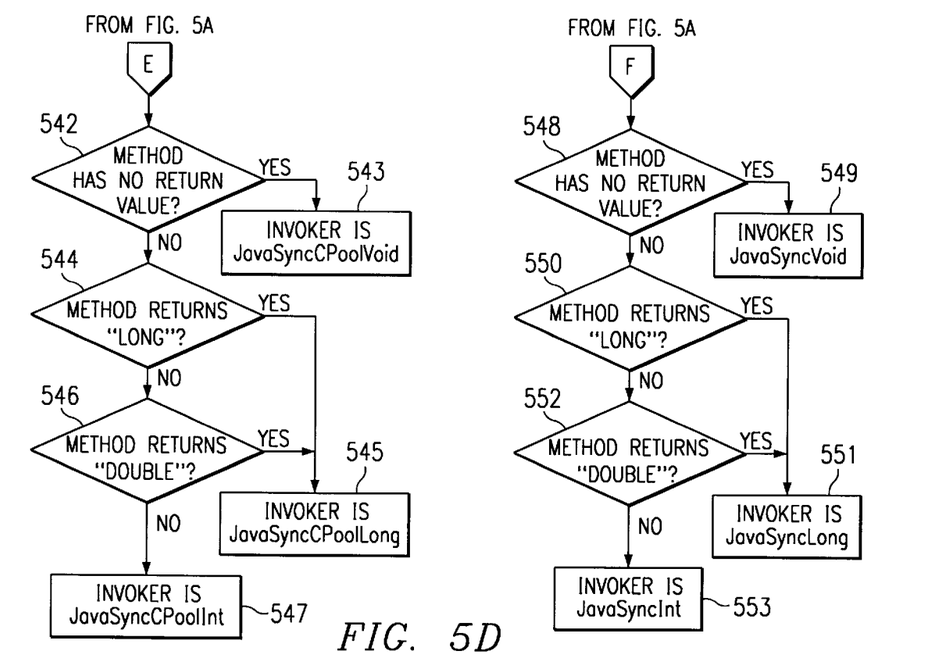
Figure 5E:
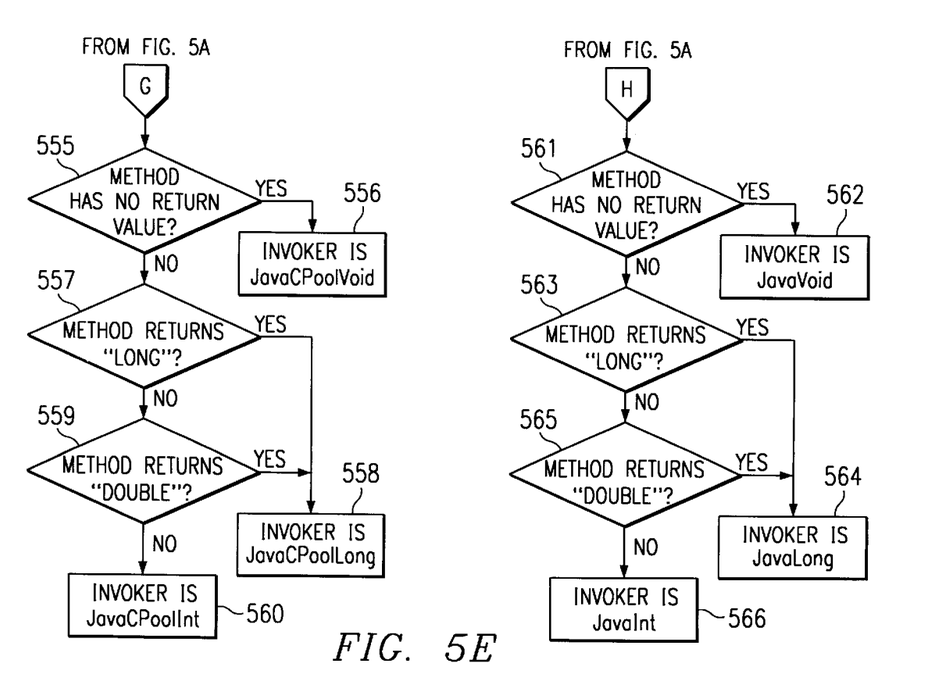

With reference now to FIG. 3, an illustration of a method block is depicted in accordance with a preferred embodiment of the present invention. Method block 300 includes invoker pointer 302. Invoker pointer 302 is a pointer to an invoker, which is a routine that performs the required setup for execution of the method and then causes the execution of the method by branching to the compiled code or by passing control to the interpreter for non-compiled code.

Method block 300 also includes other information used by JVM 200 to execute method 208 in FIG. 2. For example, the method block will also contain the number of arguments, local variables, the maximum size of the stack, along with other information used to process or execute the method. The description of the method, debugging information, and exception table definitions are examples of other information that also may be contained within method block 300.

In accordance with a preferred embodiment of the present invention, invoker pointer 302 may be a specialized invoker pointer that points to code or a routine that performs various steps or other setup work for a particular method based on the characteristics of the method. This code or routine, also referred to as an invoker, performs the necessary steps or functions to execute a method, and is specialized to perform the setup for the particular method with which the invoker is associated. In this manner, checking of characteristics for the method during runtime is avoided. Instead, the invoker is assigned to a method based on the method characteristics during class loading and initialization. In this manner, a need for runtime decisions based on method characteristic is eliminated.

Some characteristics used in assigning or associating an invoker with a method include, for example, whether a method is synchronized, the return type of the method, whether the method employs bytecodes, which affect function activation, and whether the method may take certain parameter types, which require special handling during the method call. Of course, the invoker used in the present invention also may be tailored to other types of method characteristics. The result returned or return type of the method may include, for example, byte (8 bit signed integral), char (16 bit unsigned integral), short (16 bit signed integral), int (32-bit signed integral), long (64-bit signed integral), float (32-bit IEEE 754 floating point), double (64-bit IEEE 754 floating point), boolean (truth values true and false), and object (reference to an object). A Java method may be declared to return a value that can be one of the above data types or void, which indicated the method returns no value. For the purposes of the preferred embodiment of this invention (Note: this embodiment and the examples are for a 32-bit JVM specifically on the Intel IA 32 architecture (i.e. x86). It would be slightly different for another 32-bit architecture or for a 64-bit JVM), these data types may be grouped as follows for the purposes of parameter passing and return values: 32-bit integral (byte, char, short, int, boolean, object), 64-bit integral (long), 32-bit floating point (float), and 64-bit floating point (double). It is these groupings which are important to the specialized invokers. The groupings are derived from the natural data types of the underlying CPU architecture (in this case Intel IA 32). These are results to be returned to the calling method.

Bytecodes, which effect function activation, include, for example, bytecodes, which reference the constant pool. A constant pool is a per-class or per-interface runtime representation of a constant pool table in a Java class file. The constant pool may contain several kinds of constants, ranging from numerical literal known at compile time to method and field references that are resolved at runtime. The constant pool serves a function similar to that of a symbol table for a conventional programming language although it contains a wider range of data than a normal symbol table. A benefit may be achieved by having a constant pool pointer stored in the function activation record, also referred to as a "frame". A frame in a JVM is used to support data and partial results, as well as to perform dynamic linking, to return values for methods, and to dispatch exceptions. A new frame is created each time a Java method is invoked. A frame is destroyed when the method completes, whether the completion is normal or abnormal. Frames are allocated from the Java stack of the thread creating the frame.

Based on these and other possible characteristics, a specialized invoker may be written for these types of methods. During class loading and initialization, each method is examined, and the appropriate specialized invoker is selected with the address of the invoker being stored in the method block for the method. At runtime, the interpreter would branch to the specialized invoker and only the necessary instructions to properly call the method would be executed. As a result, no runtime examination of the method is necessary.

Some examples of specializing invokers include JavaSyncint, which is an invoker that is specialized to transfer control from a Java method to a synchronized Java method which returns a 32-bit integral or floating point value to the caller. This invoker does not have to perform a runtime examination of the target method to determine if the method was synchronized nor does it have to set a flag to indicate that monitor release is required. This examination of the method is performed at class load time when this invoker was selected for this method. The invoker knows that the method is synchronized and obtains the monitor before starting the method. The invoker which regains control upon method return also knows to release the monitor when the method completes and that the return result of the method is a 32-bit integral or floating point value and places the result of the target method on the stack of the caller after removing the function activation record.

NativeLong is an invoker that is specialized to transfer control from a Java method to a non-synchronized native method, which returns a 64-bit integral value to the caller. This invoker will properly prepare the parameters for a native method call and does not need to obtain the monitor since the method is not synchronized nor need it set a flag to indicate that monitor release is not required upon return. When the native method returns, the invoker will remove the function activation record and place the 64-bit integral value return result on the stack.

The present invention avoids the need for runtime checks to determine which tasks must be performed during function activation/deactivation. Instead, a specialized invoker is selected based on a load or initialization check. The invoker in the depicted examples performs only the needed instructions for a particular method based on the method characteristics to execute the method.

Turning now to FIG. 4, a high level flowchart of a process for selecting specialized invokers is depicted in accordance with a preferred embodiment of the present invention. In the depicted example, this process is used by the JVM during class loading. The process begins by examining method characteristics (step 400). A determination is made as to whether a specialized invoker is present or available for the particular method based on the characteristics (step 402). If a specialized invoker is present, a pointer to the specialized invoker is placed in the method block for the particular method (step 404). A determination is then made as to whether more methods are present for processing (step 406). If more methods are present for processing, the process then obtains the next method (step 408) and returns to step 400 to examine the method characteristics. Otherwise, the process terminates.

With reference again to step 402, if no specialized invoker exists which supports the method's characteristics, a pointer to a generalized invoker is placed in the method block (step 410) with the process then proceeding to step 406 as described above. A generalized invoker is an invoker, which is not specialized to the method's characteristics. It performs runtime checks to properly determine which tasks must be performed during function activation and deactivation for a method.

With reference now to FIGS. 5A–5E, a flowchart of a process for selecting a specialized invoker is depicted in accordance with a preferred embodiment of the present invention. This process is executed by the JVM during class loading and/or initialization. The process is used to select a specialized invoker for a method depending on the characteristics of the method. The process begins by determining whether the method is a native method (step 500). A native method is a method implemented in a platform-dependent code. A native method is typically written in another programming language, such as, for example, C, C++, Fortran, or assembly language. If the method is a native method, the process then determines whether the method is a synchronized method (step 501). A synchronized method is a method that typically will acquire a lock, which is a lock associated with an object or class. A lock is also referred to as a "monitor". This mechanism is used for synchronizing concurrent activity of various threads executed by a JVM, which may support the execution of many threads at the same time.

If the method is a synchronized method, a determination is then made as to whether the method takes a 64-bit parameter (step 502). If the method takes a 64-bit parameter, a determination is then made as to whether the method has no return value (step 503). In other words, no value is returned by the function. If the method has no return value, an invoker for the method is set equal to NativeSyncQwordVoid (step 504). NativeSyncQwordVoid is an invoker to transfer control from a Java method to a synchronized native method, which takes at least one 64-bit parameter and returns no value. Otherwise, a determination is made as to whether the method returns "float" (step 505). If the method returns "floater", the invoker is set equal to NativeSyncQwordFloat (step 506). NativeSyncQwordFloat is an invoker to transfer control from a Java method to a synchronized native method, which takes at least one 64-bit parameter and returns a 32-bit floating point value. If the method does not return "float", a determination is made as to whether "long"

is returned by the method (step 507). If the method returns "long", the invoker is set equal to NativeSyncQwordLong (step 508). NativeSyncQwordLong is an invoker to transfer control from a Java method to a synchronized native method, which takes at least one 64-bit parameter and returns a 64-bit integral value. Otherwise, a determination is made as to whether the method returns "double" (step 509). If the method returns "double", the invoker is set equal to NativeSyncQwordDouble (step 510). NativeSyncQwordDouble is an invoker to transfer control from a Java method to a synchronized native method which takes at lease one 64-bit parameter and returns a 64-bit floating point value. Otherwise, the invoker is set equal to a NativeSyncQwordInt (step 511). NativeSyncQwordInt is an invoker to transfer control from a Java method to a synchronized native method which takes at least one 64-bit parameter and returns a 32-bit integral value.

With reference again to step 502, if the method does not take a 64-bit parameter, then a determination is made as to whether the method has no return value (step 512). If the method has no return value, the invoker is then set equal to NativeSyncVoid (step 513). NativeSyncVoid is an invoker to transfer control from a Java method to a synchronized native method, which takes no 64-bit parameters and returns no value. Otherwise, a determination is made as to whether the method returns "float" (step 514). If the method returns "float", the invoker is set equal to NativeSyncFloat (step 515). NativeSyncFloat is an invoker to transfer control from a Java method to a synchronized native method, which takes no 64-bit parameters and returns a 32-bit floating point value.

If the method does not return "float", a determination is made as to whether the method returns "long" (step 516). If "long" is returned, the invoker is set equal to NativeSyncLong (step 517). NativeSyncLong is an invoker to transfer control from a Java method to a synchronized native method, which takes no 64-bit parameters and returns a 64-bit integral value. Otherwise, a determination is made as to whether the method returns "double" (step 518). If the method does return "double", the invoker is set equal to NativeSyncDouble (step 519). NativeSyncDouble is an invoker to transfer control from a Java method to a synchronized native method, which takes no 64-bit parameters and returns a 64-bit floating point value. If "double" is not returned in step 518, then the invoker is set equal to NativeSyncInt (step 520). NativeSyncInt is an invoker to transfer control from a Java method to a synchronized native method, which takes no 64-bit parameters and returns a 32-bit integral value.

With reference again to step 501, if the method is not a synchronized method, then a determination is made as to whether the method is a 64-bit parameter (step is 521). If the method takes a 64-bit parameter, a determination is then made as to whether the method has no return value (step 522). If the method has no return value, the invoker is set equal to NativeQwordVoid (step 523). NativeQwordVoid is an invoker to transfer control from a Java method to a non-synchronized native method, which takes at least one 64-bit parameter and returns no value. Otherwise, a determination is made as to whether the method returns "float" (step 524). If "float" is returned, the invoker is set equal to NativeQwordFloat (step 525). NativeQwordFloat is an invoker to transfer control from a Java method to a non-synchronized native method, which takes at least one 64-bit parameter and returns a 32-bit floating point value.

Otherwise, a determination is made as to whether the method returns "long" (step 526). If the answer to this determination is yes, the invoker is set equal to NativeQwordLong (step 527). NativeQwordLong is an invoker to transfer control from a Java method to a non-synchronized native method, which takes at least one 64-bit parameter and returns a 64-bit integral value. Otherwise, a determination is made as to whether the method returns "double" (step 528). If "double" is returned, the invoker is set equal to NativeQwordDouble (step 529). NativeQwordDouble is an invoker to transfer control from a Java method to a non-synchronized native method, which takes at least one 64-bit parameter and returns a 64-bit floating point value. If "double" is not returned, then the invoker is set equal to NativeQwordInt (step 530). NativeQwordInt is an invoker to transfer control from a Java method to a non-synchronized native method, which takes at least one 64-bit parameter and returns a 32-bit integral value.

With reference again to step 521, if the method does not take a 64-bit parameter, the process then determines whether the method has no return value (step 531). If the invoker has no return value, the invoker is set equal to NativeVoid (step 532). NativeVoid is an invoker to transfer control from a Java method to a non-synchronized native method, which takes no 64-bit parameters and returns no value. Otherwise, a determination is made as to whether the method returns "float" (step 533). If "float" is returned, the invoker is set equal to NativeFloat (step 534). NativeFloat is an invoker to transfer control from a Java method to a non-synchronized native method, which takes no 64-bit parameters and returns a 32-bit floating point value.

With reference again to step 533, if "float" is not returned, a determination is made as to whether the method returns "long" (step 535). If "long" is returned, the invoker is set equal to NativeLong (step 536). NativeLong is an invoker to transfer control from a Java method to a non-synchronized native method which takes no 64-bit parameters and returns a 64-bit integral value. Otherwise, a determination is made as to whether the method returns "double" (step 537). If the method does return "double", the invoker is set equal to NativeDouble (step 538). NativeDouble is an invoker to transfer control from a Java method to a non-synchronized native method, which takes no 64-bit parameters and returns a 64-bit floating point value. Otherwise, the invoker is set equal to NativeInt (step 539). NativeInt is an invoker to transfer control from a Java method to a non-synchronized native method, which takes no 64-bit parameters and returns a 32-bit integral value.

With reference again to step 500, if the method is not a native method, a determination is made as to whether the method is a synchronized method (step 540). If the method is a synchronized method, a determination is made as to whether the method requires a constant pool pointer in the frame (step 541). The term frame is a synonym for a function activation record. If the method does require a constant pool pointer in the frame, a determination is made as to whether the method has no return value (step 542). If the method has no return value, the invoker is set equal to JavaSyncCPool-Void (step 543). JavaSyncCPoolVoid is an invoker to transfer control from a Java method to a synchronized Java method, which requires a constant pool pointer in the function activation record and returns no value. Otherwise, a determination is made as to whether the method returns "long" (step 544). If the method does return "long", the invoker is set equal to JavaSyncCPoolLong (step 545). JavaSyncCPoolLong is an invoker to transfer control from a Java method to a synchronized Java method, which requires a constant pool pointer in the function activation record and returns a 64-bit integral or floating point value. Otherwise, a determination is made as to whether the method returns "double" (step 546). If the method does return "double", the process also proceeds to step 545 as described above. Otherwise, the invoker is set equal to JavaSyncCPoolInt (step 547). JavaSyncCPoolInt is an invoker to transfer control from a Java method to a synchronized Java method, which requires a constant pool pointer in the function activation record and returns a 32-bit integral or floating point value.

With reference back to step 541, if the method does not require a constant pool pointer in the frame, a determination is then made as to whether the method has no return value (step 548). If the answer to this determination is yes, the invoker is set equal to JavaSyncVoid (step 549). JavaSyncVoid is an invoker to transfer control from a Java method to a synchronized Java method, which does not require a constant pool pointer in the function activation record and returns no value. Otherwise, a determination is made as to whether "long" is returned by the method (step 550). If "long" is returned, the invoker is set to JavaSyncLong (step 551). JavaSyncLong is an invoker to transfer control from a Java method to a synchronized Java method, which does not require a constant pool pointer in the function activation record and returns a 64-bit integral or floating point value. Otherwise, a determination is made as to whether the method returns "double" (step 552). If "double" is returned, the process also proceeds to step 551 as described above. Otherwise, the invoker is set equal to JavaSyncInt (step 553). JavaSyncInt is an invoker to transfer control from a Java method to a synchronized Java method which does not require a constant pool pointer in the function activation record and returns a 32-bit integral or floating point value.

With reference again to step 540, if the method is not a synchronized method, a determination is then made as to whether the method requires a constant pool pointer in the frame (step 554). If the method does require a constant pool pointer in the frame, a determination is then made as to whether the method has no return value (step 555). If the answer to this determination is yes, the invoker is then set equal to JavaCPoolVoid (step 556). JavaCPoolVoid is an invoker to transfer control from a Java method to a non-synchronized Java method, which requires a constant pool pointer in the function activation record and returns no value. Otherwise, a determination is made as to whether the method returns "long" (step 557). If "long" is returned, the invoker is set equal to JavaCPoolLong (step 558). JavaCPoolLong is an invoker to transfer control from a Java method to a non-synchronized Java method, which requires a constant pool pointer in the function activation record and returns a 64-bit integral or floating point value. Otherwise, a determination is made as to whether the method returns "double" (step 559). If the method does return "double", the process also proceeds to step 558 as described above. Otherwise, the invoker is set equal to JavaCPoolInt (step 560). JavaCPoolInt is an invoker to transfer control from a Java method to a non-synchronized Java method, which requires a constant pool pointer in the function activation record and returns a 32-bit integral or floating point value.

With reference again to step 554, if the method does not require a constant pool pointer in the frame, a determination is then made as to whether the method has no return value (step 561). If the method has no return value, the invoker is set equal to JavaVoid (step 562). JavaVoid is an invoker to transfer control from a Java method to a non-synchronized Java method, which does not require a constant pool pointer in the function activation record and returns no value. Otherwise, a determination is made as to whether the method returns "long" (step 563). If the method does return "long", the invoker is set equal to JavaLong (step 564). JavaLong is an invoker to transfer control from a Java method to a non-synchronized Java method which does not require a constant pool pointer in the function activation record and returns a 64-bit integral or floating point value. Otherwise, a determination is made as to whether the method returns "double" (step 565). If the method does return "double", the process also proceeds to step 564 as described above. Otherwise, the invoker is set equal to JavaInt (step 566). JavaInt is an invoker to transfer control from a Java method to a non-synchronized Java method which does not require a constant pool pointer in the function activation record and returns a 32-bit integral or floating point value.

Figure 6:
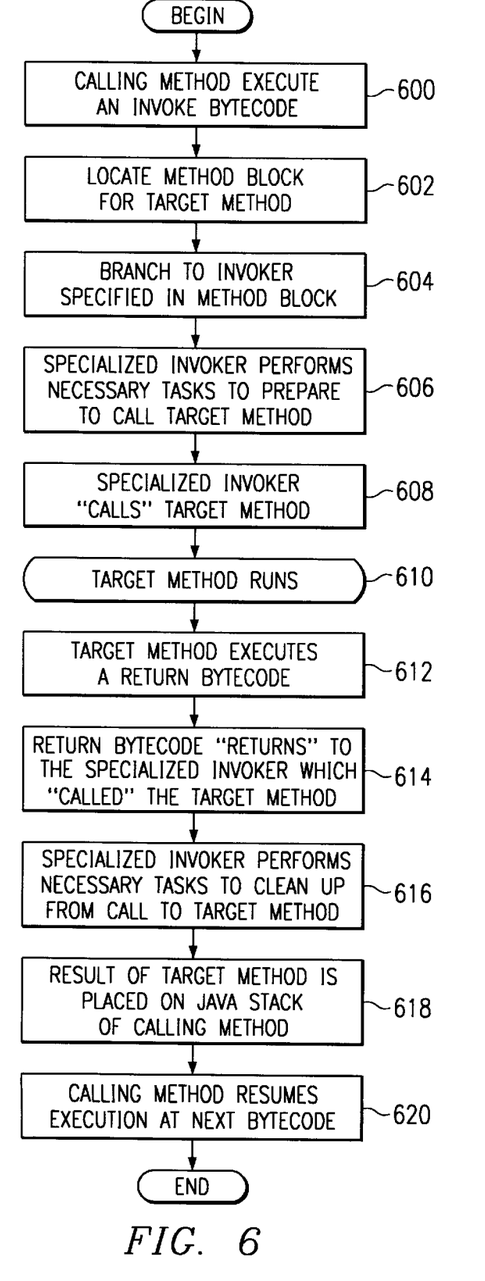
FIG. 6 is a flowchart of a method illustrating invocation of a method using a specialized invoker in accordance with a preferred embodiment of the present invention.

Turning now to FIG. 6, a flowchart of a method illustrating invocation of a method using a specialized invoker is depicted in accordance with a preferred embodiment of the present invention. The process in FIG. 6 involves the invocation of a method in which the method is associated or has been assigned a specialized invoker for performing specific functions that take into account the characteristics of the method. The invoker is identified in the method block associated with the method. The method block in the depicted example contains a pointer to the specialized invoker.

The process in FIG. 6 begins by the calling of the method that executes an invoke bytecode (step 600). Thereafter, the method block for the target method is located (step 602). The process branches to the invoker specified in the method block (step 604). The specified invoker performs the necessary tasks to prepare to call the target method (step 606), and then the invoker calls the target method (step 608). The target method runs (step 610). Thereafter, the target method executes a return bytecode (step 612). The return bytecode returns to the specialized invoker, which called the target method (step 614). This invoker now performs the necessary tasks to clean up from the call to the target method (step 616). The result of the target method is placed on the Java stack of the calling method (step 618). The calling method then resumes execution of the next bytecode (step 620) with the process terminating thereafter.

Figure 7A:
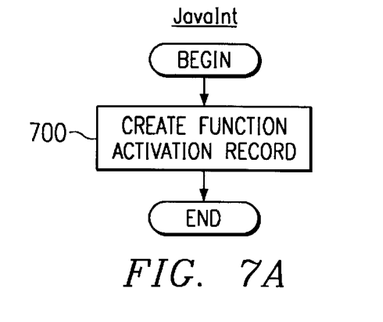
FIGS. 7A–7C are flowcharts of tasks or steps performed by specialized invokers in preparing to call a target method in accordance with a preferred embodiment of the present invention.
Figure 7B:
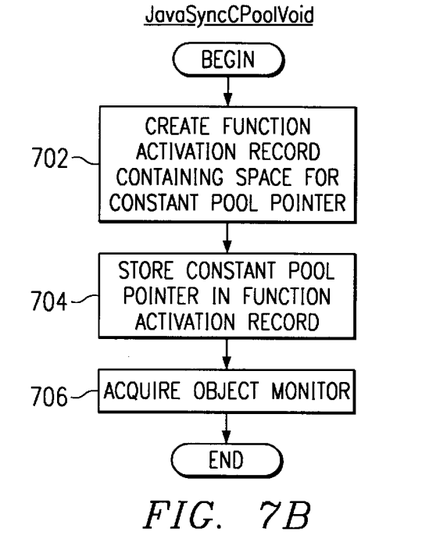
Figure 7C:
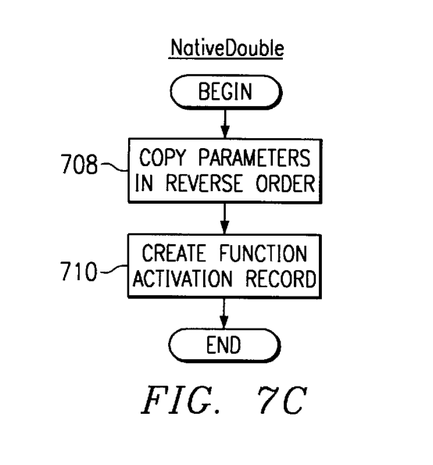

With reference now to FIGS. 7A–7C, flowcharts of tasks or steps performed by specialized invokers in preparing to call a target method are depicted in accordance with a preferred embodiment of the present invention. The processes shown in these flowcharts are more detailed descriptions of step 606 in FIG. 6.

In FIG. 7A, a JavaInt invoker creates a function activation record (step 700). This step is performed as part of the preparation to call the target method.

In FIG. 7B, a JavaSyncCPoolVoid invoker creates a function activation record containing space for a constant pool pointer (step 702). Thereafter, the constant pool pointer is stored in the function activation record (step 704). Next, an object monitor is acquired (step 706) with the process terminating thereafter.

The steps in FIG. 7B are a more detailed description of step 606 in FIG. 6 for a JavaSyncCPoolVoid invoker. In FIG. 7C, the steps illustrated are a more detailed description of step 606 in FIG. 6 for a NativeDouble invoker. The process begins by copying parameters in reverse order (step 708). Thereafter, a function activation record is created (step 710) with the process terminating thereafter.

Figure 8A:
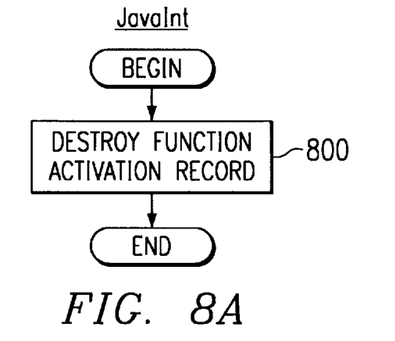
FIGS. 8A–8C are more detailed flowcharts of processes used by specialized invokers in performing necessary tasks to clean up from a call to a target method in accordance with a preferred embodiment of the present invention.
Figure 8B:
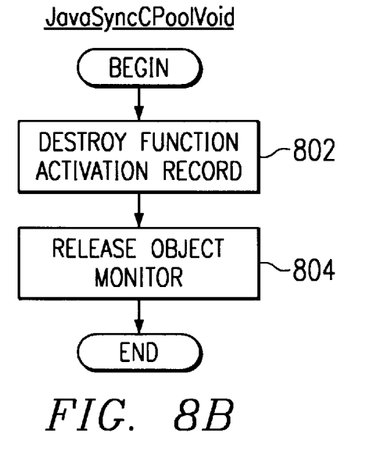
Figure 8C:
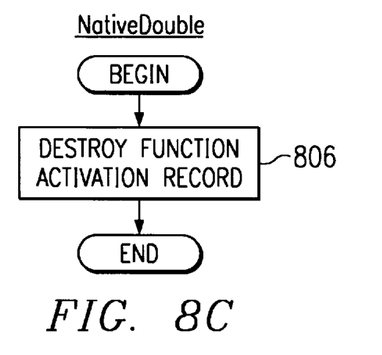

Next in FIGS. 8A–8C, more detailed flowcharts of processes used by specialized invokers in performing necessary tasks to clean up from a call to a target method are depicted in accordance with a preferred embodiment of the present invention. The processes in these flowcharts are more detailed descriptions of steps 616 in FIG. 6.

In FIG. 8A, the JavaInt invoker destroys the function activation record after the target method has completed execution (step 800). In FIG. 8B, a JavaSyncCPoolVoid invoker destroys the function activation record (step 802). Thereafter, the object monitor is released (step 804) with the process terminating thereafter. In FIG. 8C, a NativeDouble invoker destroys the function activation record (step 806) with the process terminating thereafter.

Figure 9A:
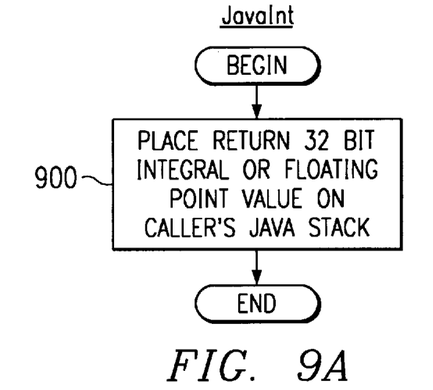
FIGS. 9A–9C are flowcharts illustrating the placement of the result of the target method on the Java stack of the calling method in accordance with a preferred embodiment of the present invention.
Figure 9B:
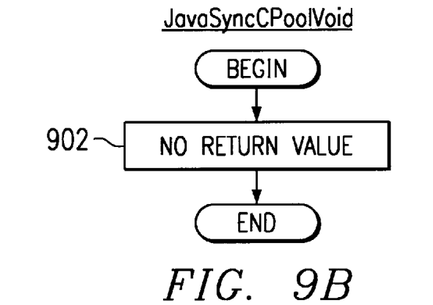
Figure 9C:
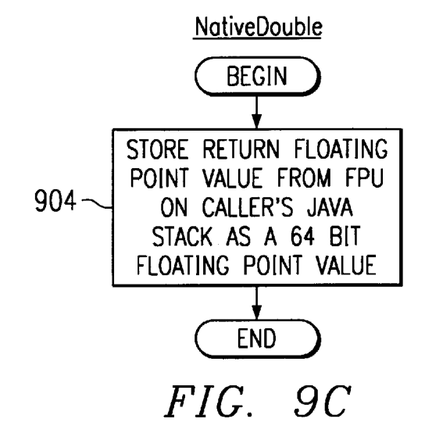

Turning next to FIGS. 9A–9C, flowcharts illustrating the placement of the result of the target method on a Java stack of the calling method are depicted in accordance with a preferred embodiment of the present invention. These steps illustrated in these flowcharts are more detailed descriptions of step 618 in FIG. 6.

In FIG. 9A, The JavaInt invoker places the return 32-bit integral or floating point value on the calling method's Java stack (step 900). In FIG. 9B, a JavaSyncCPoolVoid returns no value (step 902). In FIG. 9C, a NativeDouble invoker stores the return floating point value from the floating point unit (FPU)on the caller's Java stack as a 64-bit floating point value (step 904).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed toward processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate codes suitable for execution by the computer on which the virtual machine is located. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process for executing a method, the process comprising:
   detecting a bytecode invoking a method;
   locating a method block associated with the method, wherein the method block includes an identification of an invoker;
   calling the invoker, wherein the invoker performs setup for execution of the method;
   detecting a completion of the method; and
   returning control to the invoker, wherein the invoker completes processing of the method.

2. The process of claim 1, wherein the invoker calls the method after setup for execution of the method has been completed.

3. The process of claim 1, wherein the completion of the method is detected by an execution of a return bytecode.

4. The process of claim 1, wherein the method is a called method and wherein the invoker places results returned by the called method in a stack of a calling method.

5. The process of claim 1, wherein the method is a called method and further comprising:
   responsive to completion of the processing of the method by the invoker, resuming execution of a calling method, which called the called method.

6. The process of claim 1, wherein the method is comprised of a plurality of Java bytecodes.

7. A process for executing a group of instructions non specific to a data processing system, the method comprising:
   responsive to detecting an invocation of the group of instructions, identifying an invoker associated with the group of instructions;
   calling the invoker, wherein the invoker performs setup for execution of the group of instructions; and
   executing the group of instructions, wherein control is returned to the invoker after execution of the group of instructions completes.

8. The process of claim 7, wherein the group of instructions is a group of bytecodes.

9. The process of claim 8, wherein the group of bytecodes form a method.

10. The process of claim 9, wherein the method includes a return bytecode, which returns control to the invoker after execution of the method completes.

11. A process for executing a method, the process comprising the computer implemented steps of:

detecting loading and initialization of the method; and selectively associating a specialized invoker with the method, wherein the specialized invoker is used during runtime.

12. The process of claim 11, wherein the method is associated with a method block and wherein the selective association step comprises:

storing an identification of the invoker in the method block.

13. The process of claim 12, wherein the identification is an address of the invoker.

14. The process of claim 11, wherein the invoker is used to execute instructions needed to call the method.

15. A data processing system for executing a method, the data processing system comprising:

first detecting means for detecting a bytecode invoking a method;

locating means for locating a method block associated with the method, wherein the method block includes an identification of an invoker;

calling means for calling the invoker, wherein the invoker performs setup for execution of the method;

second detecting means for detecting a completion of the method; and returning means for returning control to the invoker, wherein the invoker completes processing of the method.

16. The data processing system of claim 15, wherein the invoker calls the method after setup for execution of the method has been completed.

17. The data processing system of claim 15, wherein the completion of the method is detected by an execution of a return bytecode.

18. The data processing system of claim 15, wherein the method is a called method and wherein the invoker places results returned by the called method in a stack of a calling method.

19. The data processing system of claim 15, wherein the method is a called method and further comprising:

responsive to completion of the processing of the method by the invoker, resuming execution of a calling method, which called the called method.

20. The data processing system of claim 15, wherein the method is comprised of a plurality of Java bytecodes.

21. A data processing system for executing a group of instructions non specific to a data processing system, the data processing system comprising:

identifying means, responsive to detecting an invocation of the group of instructions, for identifying an invoker associated with the group of instructions;

calling means for calling the invoker, wherein the invoker performs setup for execution of the group of instructions; and executing means for executing the group of instructions, wherein control is returned to the invoker after execution of the group of instructions completes.

22. The data processing system of claim 21, wherein the group of instructions is a group of bytecodes.

23. The data processing system of claim 22, wherein the group of bytecodes form a method.

24. The data processing system of claim 23, wherein the method includes a return bytecode, which returns control to the invoker after execution of the method completes.

25. A computer program product for executing a method, the computer program product comprising:

detecting a bytecode invoking a method;

locating a method block associated with the method, wherein the method block includes an identification of an invoker;

calling the invoker, wherein the invoker performs setup for execution of the method;

detecting a completion of the method; and returning control to the invoker, wherein the invoker completes processing of the method.

\* \* \* \* \*